(12) United States Patent
Baker et al.

(10) Patent No.: US 10,775,285 B1
(45) Date of Patent: Sep. 15, 2020

(54) INSTRUMENTAL ANALYSIS SYSTEMS AND METHODS

(71) Applicant: Montana Instruments Corporation, Bozeman, MT (US)

(72) Inventors: William Baker, Bozeman, MT (US); Isaac Henslee, Bozeman, MT (US); Luke Mauritsen, Belgrade, MT (US); Anjan Reijnders, Belgrade, MT (US)

(73) Assignee: Montana Intruments Corporation, Bozeman, MT (US)

( * ) Notice: Subject to any disclaimer, the term of this patent is extended or adjusted under 35 U.S.C. 154(b) by 569 days.

(21) Appl. No.: 15/457,953

(22) Filed: Mar. 13, 2017

Related U.S. Application Data

(60) Provisional application No. 62/307,260, filed on Mar. 11, 2016.

(51) Int. Cl.
  *G01N 1/42* (2006.01)
  *G01N 21/01* (2006.01)
  *H01J 49/00* (2006.01)
  *H01J 49/26* (2006.01)

(52) U.S. Cl.
  CPC ............... *G01N 1/42* (2013.01); *G01N 21/01* (2013.01)

(58) Field of Classification Search
  CPC . H01J 49/00; H01J 49/26; G01N 1/42; G01N 21/01
  USPC ......... 250/306, 307, 440.11, 441.11, 442.11, 250/443.1
  See application file for complete search history.

(56) References Cited

U.S. PATENT DOCUMENTS

| 3,444,365 A | * | 5/1969 | Loebe | H01J 37/20 250/443.1 |
|---|---|---|---|---|
| 3,894,403 A | | 7/1975 | Longsworth | |
| 3,929,516 A | | 12/1975 | Cheskis et al. | |
| 4,161,747 A | | 7/1979 | Jennings | |
| 4,745,761 A | | 5/1988 | Bazaj et al. | |
| 4,854,131 A | | 8/1989 | Sakitani et al. | |
| 4,869,068 A | | 9/1989 | Van Vloten | |

(Continued)

FOREIGN PATENT DOCUMENTS

| CN | 103901232 | 7/2014 |
|---|---|---|
| EP | 0619440 | 10/1994 |

(Continued)

OTHER PUBLICATIONS

Mueller Copper 1100 (Electrolytic Tough Pitch Copper), Alloy Digest, 1983, 2 pages.

(Continued)

*Primary Examiner* — Nicole M Ippolito
(74) *Attorney, Agent, or Firm* — Wells St. John P.S.

(57) ABSTRACT

Instrumental analysis systems are provided that can include: an analytical attachment axially aligned with a sample upon a sample stage; structure supporting both the attachment and the sample stage; and at least one band affixed to the analytical attachment and aligned symmetrically about the axis of the attachment. Methods for analyzing samples are provided. The methods can include: providing at least one band supported by a structure; firmly affixing an analytical attachment to the band, and axially aligning the attachment with a sample; and providing a temperature gradient between the band and the sample while maintaining axial alignment of the objective and the sample.

12 Claims, 6 Drawing Sheets

(56) References Cited

U.S. PATENT DOCUMENTS

| | | | |
|---|---|---|---|
| 4,968,663 | A | 11/1990 | Whang |
| 5,327,733 | A | 7/1994 | Boolchand et al. |
| 5,349,823 | A | 9/1994 | Solomon |
| 5,410,910 | A | 5/1995 | Somlyo et al. |
| 5,552,608 | A | 9/1996 | Gallagher et al. |
| 5,613,367 | A | 3/1997 | Chen |
| 5,628,195 | A | 5/1997 | Hill et al. |
| 5,737,927 | A | 4/1998 | Takahashi et al. |
| 5,749,243 | A | 5/1998 | Lester |
| 6,005,964 | A | 12/1999 | Reid et al. |
| 6,196,005 | B1 | 3/2001 | Stautner |
| 7,628,536 | B2 | 12/2009 | Umemura |
| 7,932,733 | B2 | 4/2011 | Sasajima et al. |
| 8,114,321 | B2 | 2/2012 | Johnson |
| 8,746,008 | B1 | 6/2014 | Mauritsen et al. |
| 8,756,941 | B2 | 6/2014 | Snow et al. |
| 9,303,914 | B2 | 4/2016 | Mauritsen et al. |
| 9,821,421 | B2 | 11/2017 | Mauritsen et al. |
| 2005/0126187 | A1 | 6/2005 | Li et al. |
| 2005/0204748 | A1 | 9/2005 | Yamanaka et al. |
| 2006/0148276 | A1 | 7/2006 | Renaudin |
| 2007/0234751 | A1 | 10/2007 | Nagamune |
| 2007/0278719 | A1 | 12/2007 | Adachi et al. |
| 2009/0224788 | A1 | 9/2009 | Sasajima et al. |
| 2009/0272127 | A1 | 11/2009 | Radovinsky et al. |
| 2010/0050661 | A1 | 3/2010 | Snow et al. |
| 2014/0248649 | A1 | 4/2014 | Mayer et al. |
| 2014/0130520 | A1 | 5/2014 | Snow et al. |
| 2015/0248002 | A1 | 9/2015 | Ingersoll et al. |
| 2015/0252799 | A1 | 9/2015 | Roscher |
| 2015/0323626 | A1 | 11/2015 | Jonas et al. |
| 2015/0338151 | A1 | 11/2015 | Miki |
| 2017/0168121 | A1 | 6/2017 | Yu et al. |
| 2017/0261413 | A1 | 9/2017 | Schreibeis et al. |
| 2017/0323764 | A1 | 11/2017 | Muto et al. |
| 2019/0025166 | A1 | 1/2019 | Schreibeis et al. |
| 2019/0170621 | A1 | 6/2019 | Doherty et al. |

FOREIGN PATENT DOCUMENTS

| | | |
|---|---|---|
| JP | 05059503 A | 3/1993 |
| JP | H06-341487 A | 12/1994 |
| WO | PCT/2019/55449 | 1/2019 |
| WO | PCT/2019/55449 | 1/2020 |

OTHER PUBLICATIONS

Snow, U.S. Appl. No. 61/136,138, filed Aug. 14, 2008, titled "Apparatus(es) & Methods for Improving Vibration Isolation, Thermal Dampening, Optical Access in Cryogenic Refrigerators", 18 pages.

White, G.K., "The Thermal and Electrical Conductivity of Copper at Low Temperatures", 1953, pp. 398-404.

Majorana et al., "Vibration Free Cryostat for cooling suspended mirrors", Journal of Physics: Conference Series 32, (2006), pp. 374-379.

\* cited by examiner

INSTRUMENTAL ANALYSIS SYSTEMS AND METHODS

CROSS REFERENCE TO RELATED APPLICATION

This application claims priority to U.S. provisional patent application Ser. No. 62/307,260 which was filed Mar. 11, 2016, entitled "Cryogenic Assemblies and Methods", the entirety of which is incorporated by reference herein.

TECHNICAL FIELD

The present disclosure relates to instrumental analysis systems and methods and in particular embodiments to cryogenic analysis assemblies and methods. In particular embodiments, the present disclosure relates to systems, assemblies, and/or methods that include the use of analytical attachments to instrumental analysis systems, cryogenic assemblies and/or cryostats

BACKGROUND

Instrumental analysis has been used for decades upon decades, and during this time, scientists and laboratory personnel alike continue to demand more and more accuracy from their systems, instruments, and/or methods. The slightest change in alignment between analytical instrument attachments and a sample to be analyzed can require countless hours of additional research and/or lead to poor data which almost always amounts to poor conclusions.

For example, with cryogenic analysis systems such as cryogenic assemblies, researchers utilize analytical attachments to investigate samples in their frozen state. Many cryogenic researchers use analytical attachments such as optical microscopy to study single molecules. This is achieved by using a microscope objective to focus and/or collect light from a sample which is held at cryogenic temperatures. Microscope objectives are precisely manufactured chains of lenses which are conventionally designed for room-temperature use.

High light collection efficiency also requires the objective to have a very small working distance between its tip and a sample. Researchers have historically traded off objective performance for longer working distances to allow the objective to be mounted outside of the cryostat.

The present disclosure provides cryogenic assemblies and methods, embodiments of which overcome one or more of the shortcomings of the prior art.

SUMMARY OF THE DISCLOSURE

Instrumental analysis systems are provided that can include: an analytical attachment axially aligned with a sample upon a sample stage; structure supporting both the attachment and the sample stage; and at least one band affixed to the analytical attachment and symmetrically about the axis of the attachment.

Methods for analyzing samples are provided. The methods can include: providing at least one band supported by a structure; firmly affixing an analytical attachment to the band, and axially aligning the attachment with a sample; and providing a temperature gradient between the band and the sample while maintaining axial alignment of the objective and the sample.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
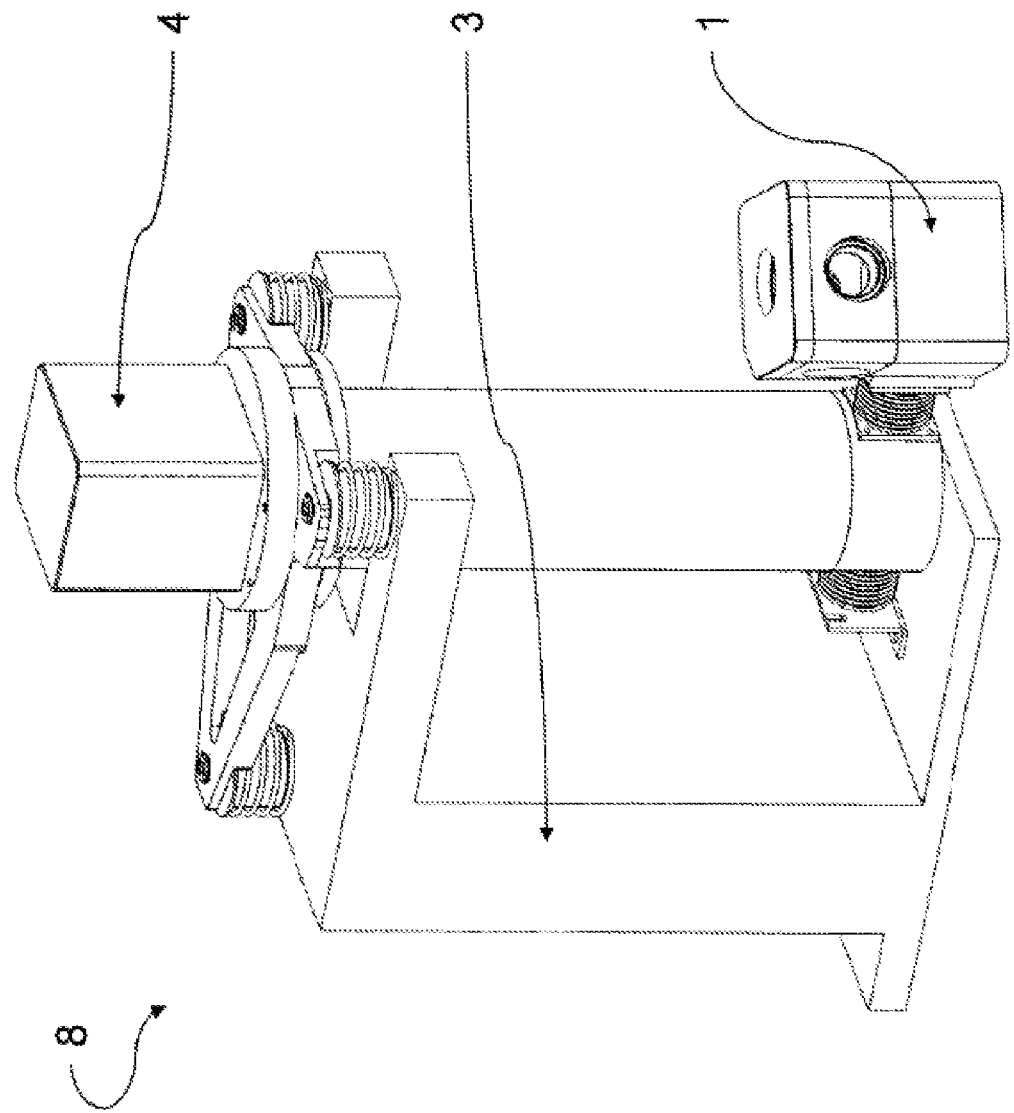
FIG. 1 is a side perspective view of an exemplary cryostation.

Embodiments of the present disclosure will be described with reference to FIGS. 1-6. Referring first to FIG. 1, an exemplary cryostation 8 is depicted. Cryostation 8 can be generally configured as described in U.S. Pat. No. 8,746,008 to Mauritsen et al. and entitled, "Low Vibration Cryocooled System for Low Temperature Microscopy and Spectroscopy Applications", the entirety of which is incorporated by reference herein. Operators may also utilize Montana Instruments Cryostation™ (Montana Instruments, Bozeman, Mont.) with the assemblies of the present disclosure to view samples using objectives.

Cryostation 8 can include a support 3 which supports a closed-cycle cryocooler expander unit 4 which can be operatively aligned with sample housing 1. Unit 4 can be a Sumitomo Heavy Industries RDK-1 OID cryocooler.

Figure 2:
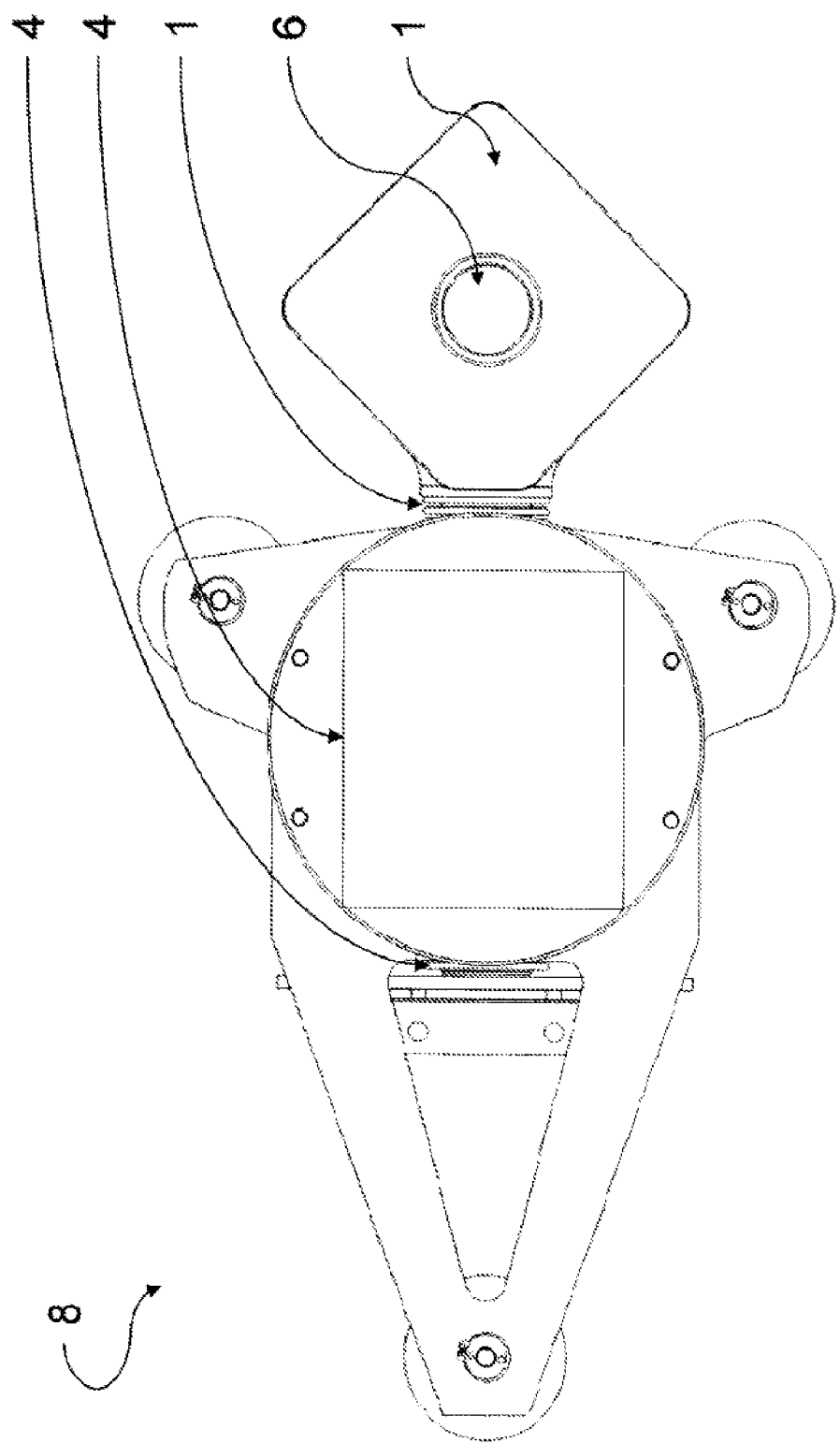
FIG. 2 is a top plan view of the cryostation of FIG. 1 according to an embodiment of the disclosure.
Figure 3:
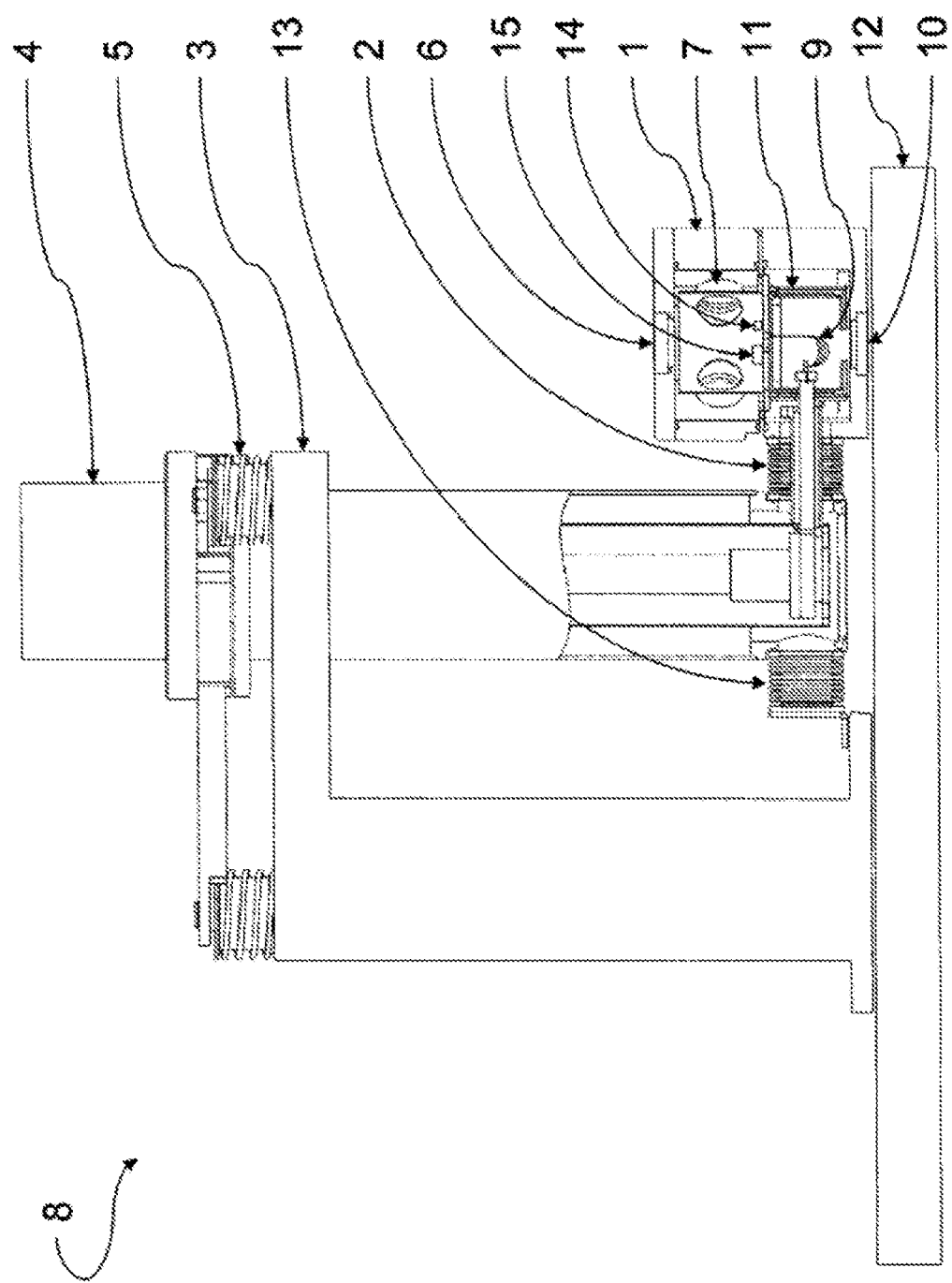
FIG. 3 is a side elevational cutaway view of the cryostation of FIG. 1 according to an embodiment of the disclosure.

Referring next to FIGS. 2 and 3, spring dampers 5 may be operatively aligned between unit 4 and support 3. Unit 4 can be connected to sample housing 1 and cryogenic sample support 11 by bellows 2. The diameter of bellows 2 can be in the range from about 0.75 inches to about 3 inches and is more preferably in the range from about 1 inch to about 1.25 inches.

In normal use, both rigid support 3 and sample housing 1 rest on an optical bench 12 or on another rigid plane. In a more preferred embodiment, optical bench 12 is a Newport air isolated workstation.

The sample is preferably supported by a rigid cryogenic support 11 which holds the sample in a fixed location relative to the optical bench 12 or rigid plane on which the invention rests. The cryocooler also can be attached to the rigid support 11 by a separate flexible hermetic sealing bellows 13 that is in alignment with flexible vacuum bellows 2. A temperature sensor 14 and a heater 15 may be located on the cryogenic support 11 near the sample to allow for an adaptive feedback loop to reduce temperature fluctuations. In at least one embodiment, the temperature sensor is a Cernox temperature sensor from Lakeshore Cryogenics Inc.

In more detail, system 8 allows a sample to be cryogenically cooled and rigidly mounted to the optics bench 12 and aligned separately (situated a distance away) from the axis of the cryocooler expander unit 4 such that top access to the sample housing 1 via top access port 6 may be achieved. This unique configuration in which the sample is located off axis from and a distance away from the cryocooler expander unit 4 reduces sample vibration by isolating the sample. The pair of flexible vacuum bellows 2 and 13 which connect the cryocooler expander unit 4 to the sample housing 1 and to the rigid support 3 are preferably aligned along a common axis and opposed to one another such that when there is a differential pressure on the inner and outer surfaces of the bellows 2, there is no net force imposed on the cryocooler expander unit 4.

The cold stage of a closed-cycle cryocooler fluctuates in temperature due to the cyclical alternating pressure of the cooled Helium gas with each cycle of gas entering and exiting the expander section of the cryocooler. Additionally, the parasitic and active heat loads on the cryocooler cause the cold stage to rise in temperature between each cycle. Typically, the way to minimize thermal fluctuations in cryogenic systems is to use a PID control loop; however, this method results in an unnecessary amount of heat input to the system, which significantly raises the cold stage temperature.

In accordance with example implementations, system 8 can be configured to include a temperature sensor 14 and a heater 15 located near (by "near," it is located on the same temperature platform and within 2 inches) the sample on the cryogenic support 11 such that temperature can be read by an electronic device for data acquisition.

Specifically, the cryocooler can be operated manually until the cryogenic support 11 has reached a stable temperature near the desired measurement temperature as measured by the temperature sensor 14. At that time the temperature profile of at least one cycle of the cryocooler is recorded. Based on this initial, uncontrolled temperature profile, a profile of heater values which is inversely proportional to the recorded temperature profile is applied using heater 15 synchronously with the cryocooler cycle and adjusted for phase relative to the cryocooler cycle to optimize the temperature minimization.

A second phase of optimization of the heater profile can be obtained by measuring the residual cyclical temperature variation of each value of the heater profile with sensor 14. A correction factor to each value of the heater profile is applied using heater 15 that is proportional to each measured residual value.

Optical access to the cryocooled sample inside the sample housing 1 can be through the top optical access port 6 and/or through the side access ports 7. These ports are part of what can be referred to as a viewing assembly that resides above the sample platform or cryogenic support. In accordance with example embodiments of the disclosure, this assembly can be subject to temperature differences between portions of the assembly.

A laser, optics and/or a microscope or other analytical attachments may be used with system 8 to interrogate and observe a cooled sample, all of which are supported by an optics bench. Operation of the system can include cooling the cryocooler expander unit 4 to cryogenic temperatures and using the optical apertures 6 and/or 7 for observation of the sample using attachments such as microscopes or other imaging devices and interrogation of the sample using lasers or other electromagnetic energy propagation devices along with detection of signals returned by the interrogated sample. It is important to keep these attachments aligned with the sample in order to obtain reliable data. Movement of the attachment in relation to the sample can make sample analysis difficult, if not impossible.

Many variations of the disclosure will occur to those skilled in the art. Some variations include an inverted cryocooler expander unit 4 such that it would be located underneath the optics bench 12 and extend up through a hole in the optics bench, or extend up over the edge of the optics bench 12. Other variations call for the cryocooler expander unit 4 being supported by structure separate from the optics bench 12 where the sample housing 1 is located. Additionally, the environment surrounding the sample may be altered or changed by adding a magnetic field, high pressure, RF field, or other types of environmental alterations. All such variations are intended to be within the scope of this disclosure.

The applicant recognizes that the prior art use of longer working distances places windows between the objective and the sample, and these windows can cause aberrations. The applicant recognizes that microscope use for extended periods of time can give rise to thermal drift associated with fluctuations in room temperature. As the mount used to hold the objective warms or cools, its material expands or contracts, causing the objective to go in and out of focus on a sample. Mechanical vibrations also create problems for researchers. The applicant recognizes that flimsy mounts can cause the objective to move, relative to the sample, beyond its optical resolution.

Figure 4:
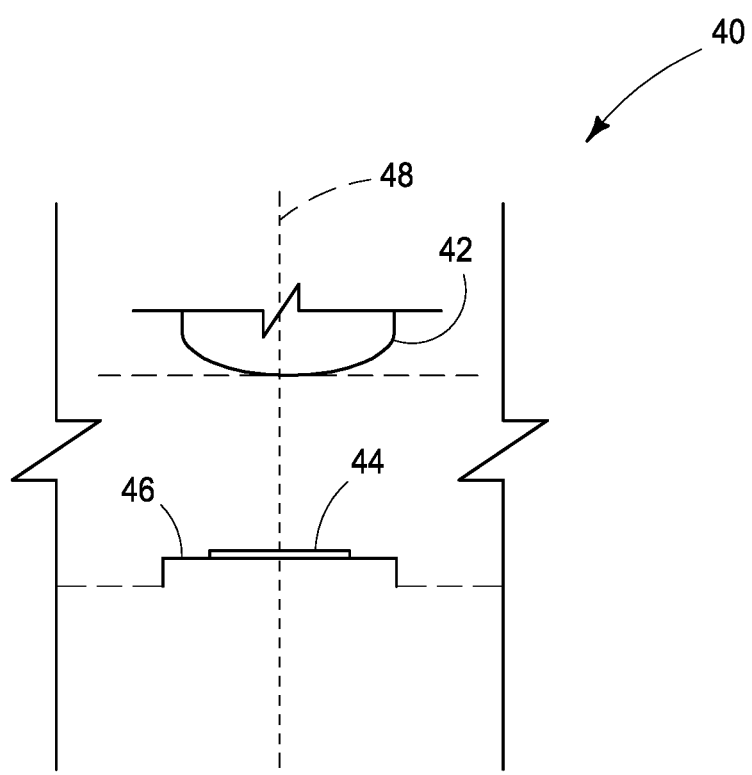
FIG. 4 is a portion of a cryogenic assembly according to an embodiment.
Figure 5:
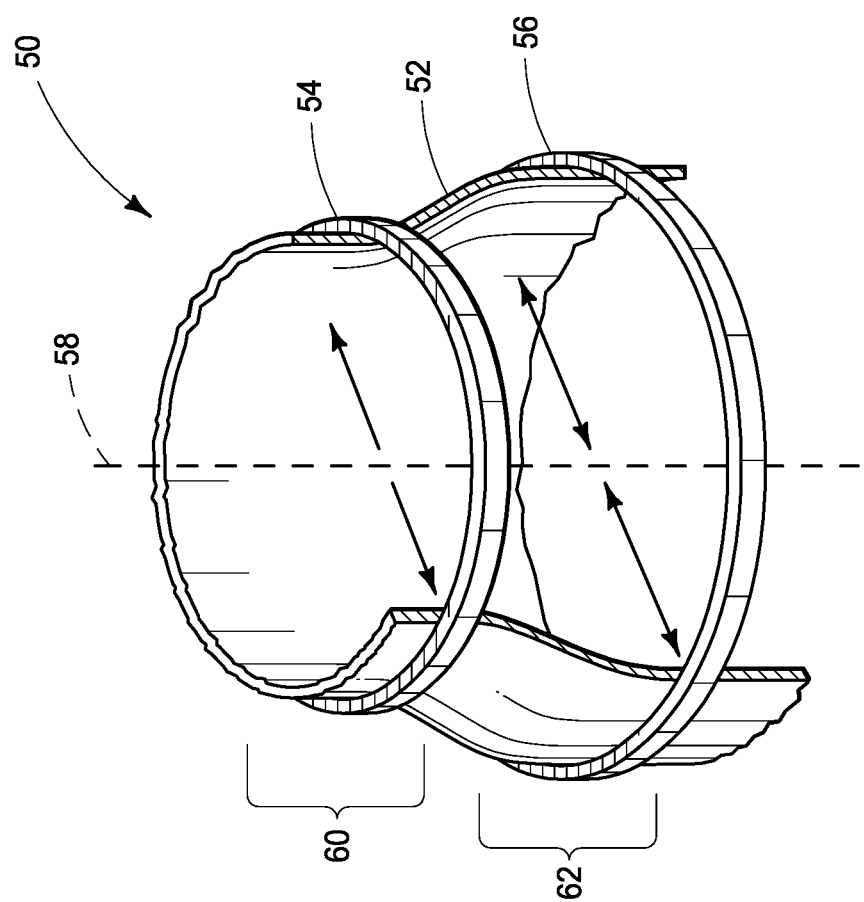
FIG. 5 is another portion of cryogenic assembly according to an embodiment of the disclosure.

To address these problems recognized by the applicant and the shortcomings of the state of the art of instrumental analysis systems and/or methods, the present disclosure provides systems that can include an analytical attachment axially aligned with a sample upon a sample stage. At least one example of this is configuration is shown in FIG. 4. The systems can also include a chamber housing both the attachment and the sample stage. In accordance with at least one example implementation, FIG. 5 depicts a cylindrical chamber that can house the attachment and sample stage of FIG. 4. In a cryogenic analysis method, the chamber may be under vacuum. The systems can include at least one band about a portion of the housing, the attachment being affixed to the band as shown in FIG. 5.

Referring to FIG. 4, a portion of a cryogenic assembly 40 according to an embodiment of the disclosure is shown that includes an objective 42 and a sample 44 upon a stage 46. Objective 42 is an example analytical attachment and cryogenic assembly 40 is an example component of an instrumental analysis system. In accordance with example implementations, FIG. 4 depicts an operable alignment of objective 42 with sample 44 within a cryogenic assembly. This operable alignment can be considered an axial alignment. Objective 42 can be a set of optics and/or lenses that may or may not be bundled, but are configured to provide a view of sample 44 operatively aligned therewith. Sample 44 can be a solid sample and stage 46 can be configured to support sample 44 in operable viewing alignment with objective 42. Objective 42 can be firmly supported by at least one of the bands shown in FIG. 5, for example.

Objective 42 can be maintained a temperature that is different than the temperature of its surroundings. For example, the temperature of objective 42 can be different than the temperature of the sample and/or stage. Accordingly, there can be a temperature gradient between objective 42 and the sample and/or sample stage. The temperature of objective 42 and/or optics and/or lenses and/or lens surfaces of objective 42 can be at least 250 K and/or at least 100 K different than sample 44 and/or stage 46. Sample 44 and/or stage 46 can be less than about 200 K and in some embodiments maintained at less than 40K and/or a temperature of about 4 K.

As is depicted in FIG. 4, an axis 48 can exist between sample 44 and attachment 42. As depicted, axis 48 extends vertically between these components. This can be considered the axial alignment of these components and while shown here with the components above one another, other arrangements are contemplated. For example, the attachment, such as optics can be arranged to view in the horizontal plane or from the side of sample 44 rather than above.

In this arrangement, the axial alignment of the attachment is still important as movement can impact the view of the sample.

Referring next to FIG. 5, one example portion of a cryogenic assembly 50 is shown that includes a structure supports 54 and 56. One or both of these bands can be aligned symmetrically about axis 58 which can be an axis such as axis 48 upon which attachments and samples are aligned. The bands may be concentrically aligned in relation to one another as well. While support structure 52 is shown as a single construction, it may well be multiple constructions. Further, support structure 52 is shown as substantially cylindrical, however, non-cylindrical structures that may or may not include non-cylindrical bands are also contemplated. Additionally, assembly 50 may form a vacuum chamber housing or may be contained within a vacuum chamber housing. Accordingly, supports 54 and 56 can be within a vacuum chamber housing.

In addition, a sample may be aligned along axis 58 and an attachment may be aligned to view along an axis that is normal to axis 58. In this alignment, the attachment may well be coupled to one of the structure supports 54 or 56. In accordance with example implementations, the structure the attachment is coupled to may be maintained at a constant temperature.

In accordance with example implementations, assembly 50 can include a structure 52 extending between support such as band 54 and support structure 56, such as another band. Band 54 and/or structure 56 can be a portion of a complete piece that includes structure 52, or band 54 and/or structure 56 can be separate pieces that are coupled to structure 52. Band 54 can take the form of a ring that encompasses structure 52 for example. Structure 56 can also take the form of a ring that encompasses support structure 52, but structure 56 may also take many other forms such as partially or fully rectangular, for example. Band 54, support structure 52, and structure 56 may be symmetrical in comparison with the axis when the entirety of these components is the same temperature.

In accordance with example implementations, there can be a temperature gradient between 54 band and structure 56 which may define regions, portions or zones about the assembly of the system. For example, band 54 can be associated with one portion 60 and structure 56 can be associated with another portion 62. Structure 56 can be firmly affixed to a sample stage for example and a temperature gradient controlled through these portions by controlling the temperatures of band 54 and structure 56. In accordance with example embodiments, support structure 52 can be sufficiently pliable to provide support but allow for expansion and/or contraction of related portions.

As is depicted in FIG. 5, band 54 resides above structure 56. This arrangement is for purposes of example only. Other arrangements including band 54 below structure 56 are contemplated as well. Regions 60 and 62 are depicted to demonstrate temperature controlled 60 and uncontrolled 62. In the controlled region 60, a cryo environment can be provided for example. In the uncontrolled region 62 an ambient region can be provided, but the regions may both be controlled with substantial temperature differences existing between them. In accordance with other implementations, there may be temperature differences between regions 60 and 62, with one or both of the temperatures of each of the regions being thermally controlled. Implementations are contemplated wherein region 62 is above ambient temperature and region 60 may be at a temperature lower than the temperature of region 62.

As FIG. 5 depicts, an axis 58 can extend within the portion and band 54 and structure 56 can have a relationship to this axis. For region 62, the temperature changes can cause structure 56 to expand and/or contract as depicted by the arrows. This change in structure 56 can deform support structure 52 and impact band 54 which can impact the relation of the attachment with a sample where the attachment is coupled to band 54. However, it has been discovered that where a band is utilized, this impact is minimized. For example, in a configuration without a band, a simple coupling of the attachment to a bar along the housing or to the housing itself, the change in region 62 changes the relation of the attachment to the sample.

Figure 6:
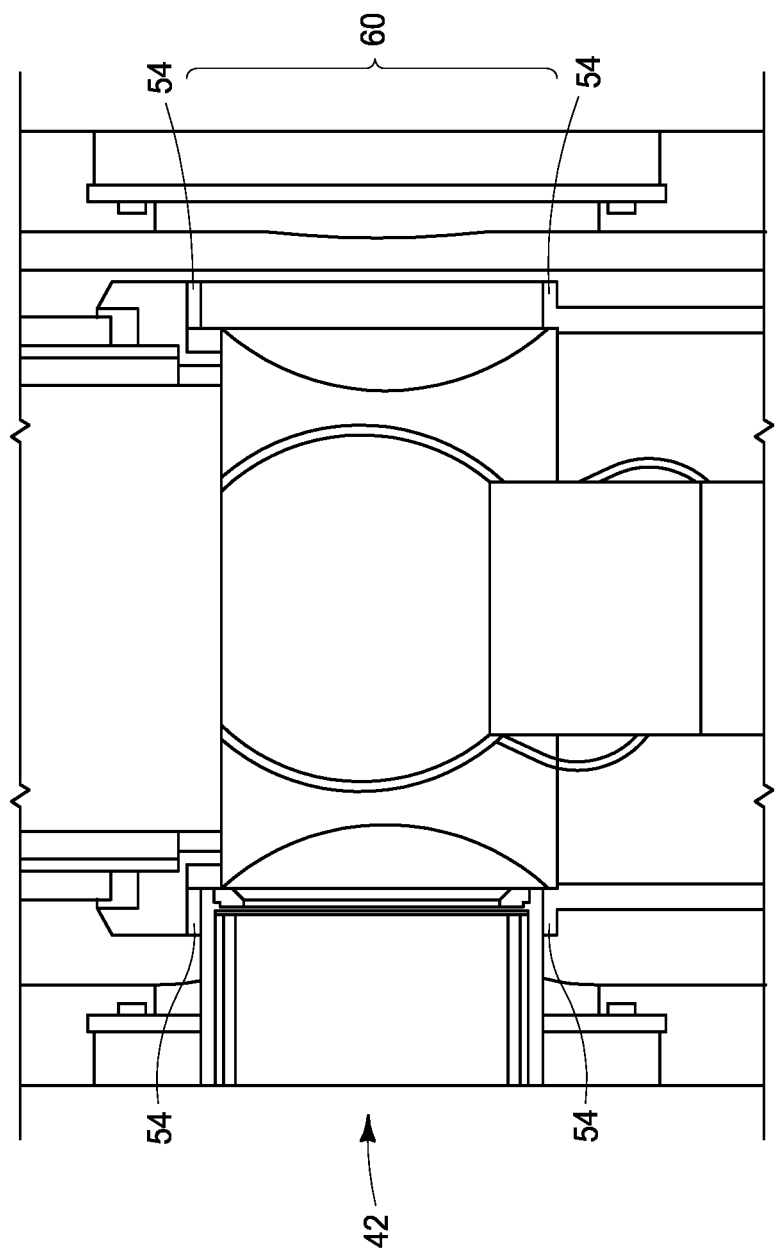
FIG. 6 is yet another portion of a cryogenic assembly according to an embodiment of the disclosure.

Referring next to FIG. 6, region 60 is depicted as part of a viewing assembly that includes a portion configured to receive optics 42. Utilizing bands 54, optics 42 can be restrained in a working relationship with a sample.

Although some embodiments are shown to include certain features, the Applicant specifically contemplates that any feature disclosed herein may be used together or in combination with any other feature on any embodiment of the invention. It is also contemplated that any feature may be specifically excluded from any embodiment of the invention.

The systems of the present disclosure can be utilized to analyze a sample. For example, a cylindrical housing having at least one band about the cylindrical housing can be provided. An analytical attachment can be firmly affixed to the band, and the attachment can be axially aligned with a sample within the cylindrical housing. A temperature gradient can be provided between portions of the cylindrical housing while maintaining axial alignment of the objective and the sample.

The methods can also include providing another band about the housing. The one and the other bands can have different temperatures. In accordance with example implementations thermal energy can be transferred between the two bands. With these two portions at different temperatures, steady optical performance can be maintained between the objective and the sample. A constant distance can be maintained between the attachment and the sample and/or peak-to-peak displacements of the attachment can be maintained below the diffraction limit.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A method for analyzing a sample, the method comprising:
   providing at least one band supported by a structure;
   firmly affixing an analytical attachment to the band, and axially aligning the attachment with a sample; and
   providing a temperature gradient between the band and the sample while maintaining axial alignment of the objective and the sample, wherein during the providing of the temperature gradient the band and attachment move unitarily.

2. The method of claim 1 further comprising providing another band structurally supported about the sample, the one and the other bands having different temperatures.

3. The method of claim 2 further comprising flowing thermal energy between the two bands.

4. The method of claim 1 wherein the analytical attachment is a microscope objective and the objective and sample are both under vacuum.

5. The method of claim 4 further comprising maintaining steady optical performance between the objective and the sample.

6. The method of claim 1 further comprising controlling the temperature of the analytical attachment by controlling the temperature of the one band.

7. The method of claim 1 further comprising maintaining a constant distance between the attachment and the sample.

8. The method of claim 1 further comprising maintaining peak-to-peak displacements of the attachment below diffraction limit range.

9. The method of claim 1 further comprising providing another band structurally supported about the sample, the one band defining one portion of the system and the other band defining another portion of the system.

10. The method of claim 9 further comprising controlling the temperature of the portions of the system by controlling the temperatures of the bands.

11. The method of claim 1 wherein the structure is laterally aligned with the band.

12. The method of claim 1 wherein exposure of the band to different thermal environments causes expansion or contraction of the band.

* * * * *

UNITED STATES PATENT AND TRADEMARK OFFICE
CERTIFICATE OF CORRECTION

PATENT NO. : 10,775,285 B1
APPLICATION NO. : 15/457953
DATED : September 15, 2020
INVENTOR(S) : William Baker et al.

Page 1 of 1

It is certified that error appears in the above-identified patent and that said Letters Patent is hereby corrected as shown below:

On the Title Page

(56) References Cited, page 2, 1st Column, 29th Line – Replace "2014/0248649 A1 4/2014 Mayer et al." with --2014/0248649 A1 9/2014 Mayer et al.--

In the Specification

Column 1, Line 19 – Replace "assemblies and/or cryostats" with --assemblies and/or cryostats.--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*